United States Patent
Nagano

(10) Patent No.: US 10,541,524 B2
(45) Date of Patent: Jan. 21, 2020

(54) ELECTRONIC APPARATUS

(71) Applicant: CANON KABUSHIKI KAISHA, Tokyo (JP)

(72) Inventor: Hideaki Nagano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/390,378

(22) Filed: Apr. 22, 2019

(65) Prior Publication Data
US 2019/0334338 A1      Oct. 31, 2019

(30) Foreign Application Priority Data

Apr. 27, 2018   (JP) .................................. 2018-086462

(51) Int. Cl.
*H02G 15/013*       (2006.01)
*H02G 15/10*        (2006.01)

(52) U.S. Cl.
CPC ........... *H02G 15/013* (2013.01); *H02G 15/10* (2013.01)

(58) Field of Classification Search
CPC .............................. H02G 15/013; H02G 15/10
USPC ......................................................... 174/564
See application file for complete search history.

(56) References Cited

U.S. PATENT DOCUMENTS

| 6,364,703 | B1 * | 4/2002 | Ito ....................... H01R 13/5208 |
| | | | 439/589 |
| 2016/0262272 | A1 * | 9/2016 | Oba ......................... H05K 1/18 |
| 2017/0347478 | A1 * | 11/2017 | Park ..................... H04M 1/0249 |

FOREIGN PATENT DOCUMENTS

JP         2017050912 A      3/2017

* cited by examiner

*Primary Examiner* — Sherman Ng
(74) *Attorney, Agent, or Firm* — Venable LLP

(57) ABSTRACT

An electronic apparatus includes a deformable seal member having a first hole portion through which the cable passes, a case that includes a seal container configured to house the seal member and a second hole portion connected to the seal container and used for the cable to pass, and a pressing member fixed to the case and including a third hole portion through which the cable passes, and a pressing portion configured to press the seal member housed in the seal container. At least one of part of the seal container connected to the second hole portion and part of the pressing member connecting the pressing portion and the third hole portion to each other has a slope inclined to the cable. The seal member pressed by the pressing portion partially enters a space between the slope and the cable.

7 Claims, 6 Drawing Sheets

ELECTRONIC APPARATUS

BACKGROUND OF THE INVENTION

Field of the Invention

The present invention relates to an electronic apparatus having waterproof and dustproof functions, and more particularly to an electronic apparatus in which a cable extends from a case to the outside.

Description of the Related Art

Some electronic apparatus having waterproof and dustproof functions include a cable that is connected to an electric circuit board in the electronic apparatus and extends through a hole portion in an exterior case to the outside. Japanese Patent Laid-Open No. ("JP") 2017-050912 discloses a structure of an electronic apparatus which provides the waterproof and dustproof functions to the periphery of the cable. More specifically, an exterior case has a cylinder portion with a hole used for the cable to pass, and an external screw is provided on the outer circumference of the cylinder portion. Then, a cap having an internal screw is fastened around the external screw, and a pressing force is applied to a seal member disposed between the cylinder portion and the cable to seal the space between the exterior case (cylinder portion) and the cable.

JP 2017-050912 further discloses a divided structure of the exterior case so as to provide a minimum necessary diameter of the hole for the cable to pass, and to make compact the cylinder portion.

However, the electronic apparatus disclosed in JP 2017-050912 uses the cap to be fastened around the outer circumference of the cylinder portion for a member that applies the pressing force to the seal member, and thus requires at least cable pulled part to have a size corresponding to the diameter of the cap.

SUMMARY OF THE INVENTION

The present invention provides a compact electronic apparatus with good waterproof and dustproof functions at a hole portion through which a cable passes.

An electronic apparatus according to one aspect of the present invention includes a deformable seal member having a first hole portion through which the cable passes, a case that includes a seal container configured to house the seal member and a second hole portion connected to the seal container and used for the cable to pass, and a pressing member fixed to the case and including a third hole portion through which the cable passes, and a pressing portion configured to press the seal member housed in the seal container. At least one of part of the seal container connected to the second hole portion and part of the pressing member connecting the pressing portion and the third hole portion to each other has a slope inclined to the cable. The seal member pressed by the pressing portion partially enters a space between the slope and the cable.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1A:
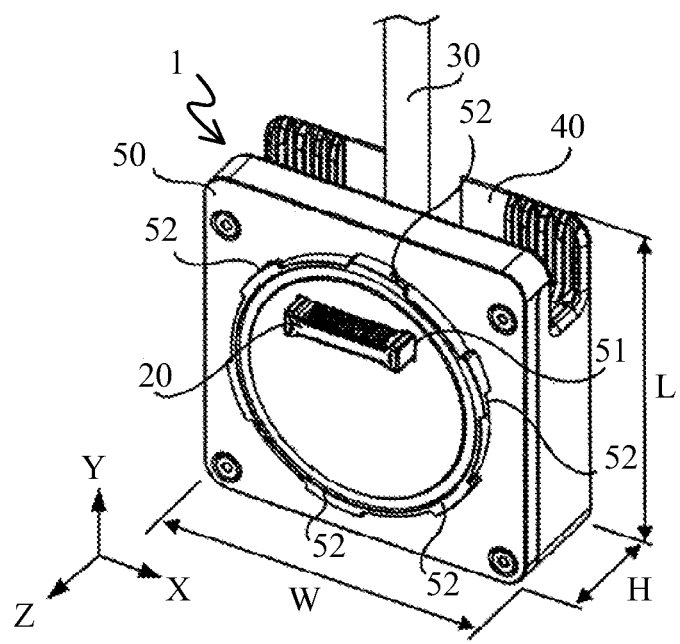
FIGS. 1A and 1B are overviews of a coupler according to one embodiment of the present invention.
Figure 1B:
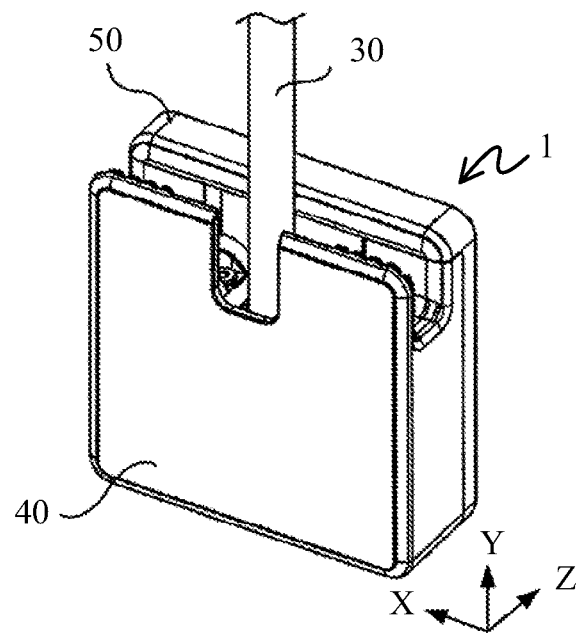

FIGS. 1A and 1B illustrate the external appearance of a coupler 1 as an electronic apparatus according to one embodiment of the present invention. FIG. 1A illustrates the coupler 1 viewed from the front side, and FIG. 1B illustrates the coupler 1 viewed from the back side.

As illustrated in FIG. 1A, the coupler 1 has a width W as a size in the X direction in the figure, a length L as a size in the Y direction, and a height H as a size in the Z direction. A more detailed definition and relationship among the width W, the length L, and the height H will be described later.

The coupler 1 includes a main case (simply referred to as a case hereinafter) 40, a cover case (simply referred to as a cover hereinafter) 50, and a cable 30 extending from the inside of the case 40 to the outside (+Y direction). The coupler 1 further includes a connector 20 protruding to the outside (+Z direction) from an opening 51 in the cover 50. The connector 20 is electrically connectable to an unillustrated external device. The cover 50 has a plurality of connecting portions (bayonet claw portions) 52 configured to mechanically connect the coupler 1 to the external device and formed to surround the connector 20.

Figure 2:
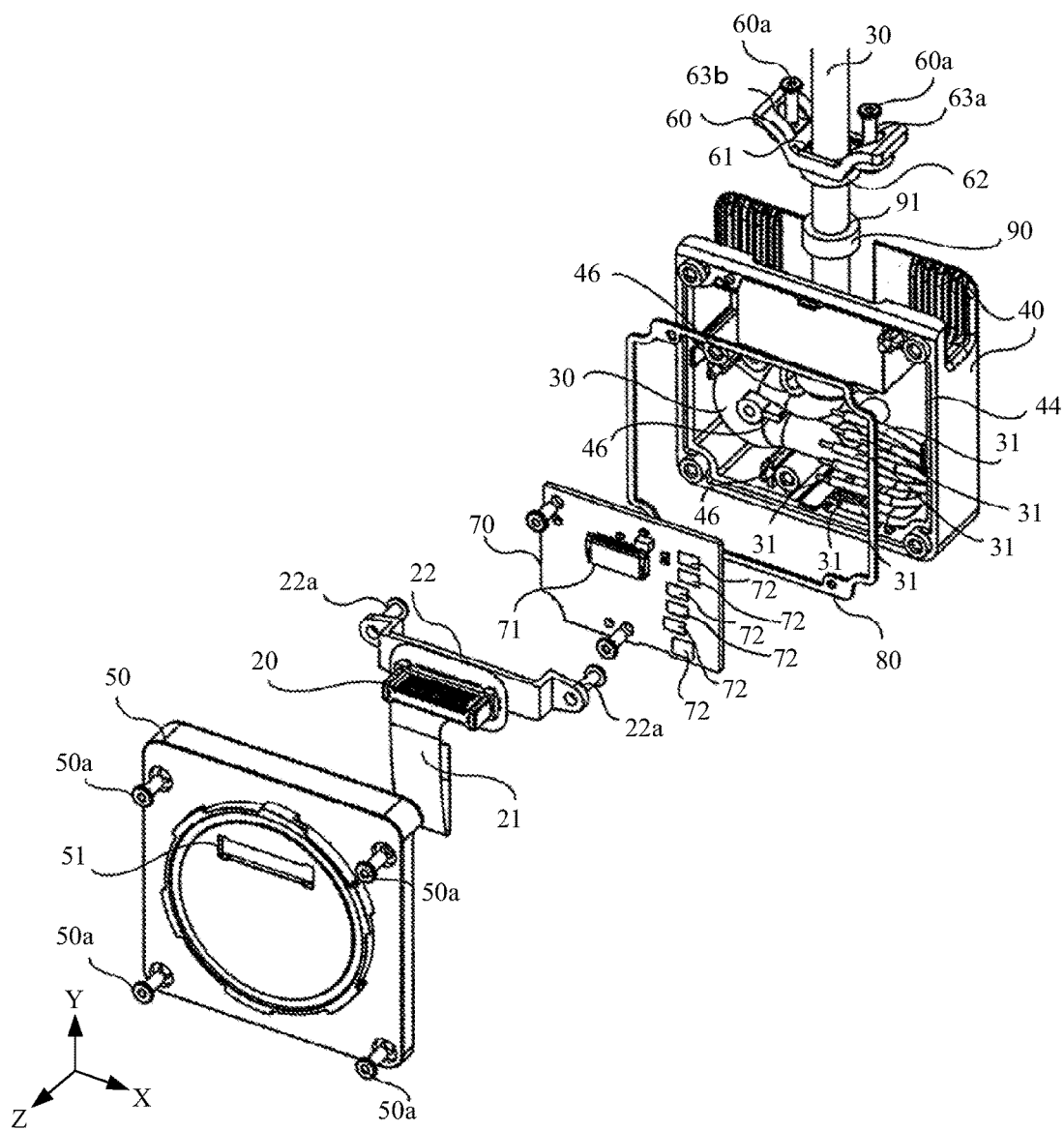
FIG. 2 is an exploded perspective view of the coupler.
Figure 5:
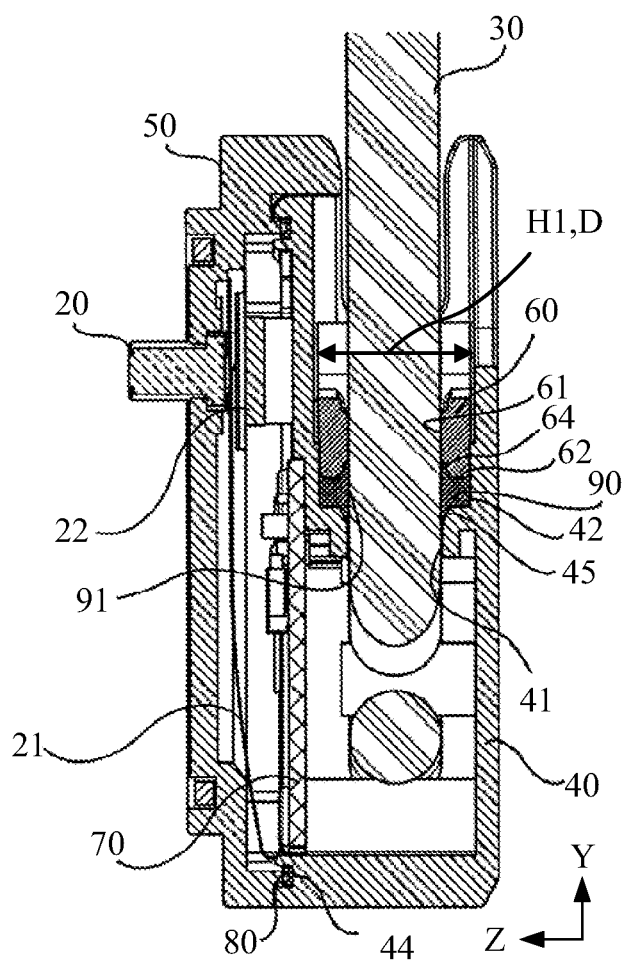
FIG. 5 is a sectional view taken along a line A-A in FIG. 4A.

Referring now to FIGS. 2 and 5, a description will be given of an internal configuration of the coupler 1. FIG. 2 is an exploded view of the coupler 1, and FIG. 5 illustrates the YZ section of the coupler 1. The coupler 1 is configured to cover the internal space with the case 40 and the cover 50. The case 40 and the cover 50 are made of a plastic material such as polycarbonate.

The connector 20 is mounted on a flexible printed circuit board 21 and fixed onto a back surface of the cover 50 via the connector supporting member 22 while protruding through the opening 51 in the cover 50. A connector supporting member 22 is made of a plastic material, such as polycarbonate, and fixed onto the back surface of the cover 50 by two fixing screws 22a.

A connector 71 is connected to the flexible printed circuit board 21 and mounted on an electric circuit board 70. Each core (wire) 31 of the cable 30 is connected to a corresponding one of cable connecting portions 72 at one end portion of the electric circuit board 70 through soldering or the like. The flexible circuit board 21 and the core 31 of the cable 30 are electrically connected to each other via a circuit mounted on the electric circuit board 70.

The cable 30 is inserted into the coupler 1 through a cable insertion hole portion (second hole portion) 41 in the case 40. A plurality of ribs (projections) 46 as guide portions are formed inside the case 40, and the cable 30 is bent (meandered), guided between these ribs 46, and disposed in the coupler 1. Meandering the cable 30 in this way prevents the cable 30 from falling off.

A seal frame 80 is a member for sealing between the case 40 and the cover 50, and is made of a deformable elastic material such as urethane foam or foamed rubber. The cover 50 is assembled to the case 40 so that the seal frame 80 attached to the back surface of the cover 50 is engaged with a groove portion 44 disposed around a cover side opening in the case 40. Four fixing screws 50a inserted into the four hole portions in the cover 50 are tightened into the four screw hole portions in the case 40, and the cover 50 is fixed onto the case 40. Thereby, the seal frame 80 is pressed by the case 40 and the cover 50, and can seal the space between the case 40 and the cover 50.

A seal ring (seal member) 90 is a member used for the cable 30 to pass through its perforation hole portion (first hole portion) 91 and to seal the space between the case 40 and the cable 30. Like the seal frame 80, the seal ring 90 is made of a deformable elastic material such as urethane foam or foamed rubber. The seal ring 90 is disposed in a seal container 42 in the case 40 illustrated in FIG. 5.

As illustrated in FIG. 5, a pressing member 60 is a member for pressing the seal ring 90 disposed in the seal container 42, and is made of a plastic material such as polycarbonate. The pressing member 60 has a perforation hole portion (third hole portion) 61 through which the cable 30 passes, and a pressing portion 62 that contacts the seal ring 90 and presses the same.

Figure 3:
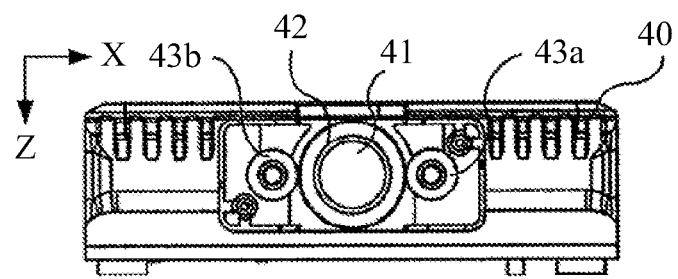
FIG. 3 is a top view of a case as component of the coupler.
Figure 4B:
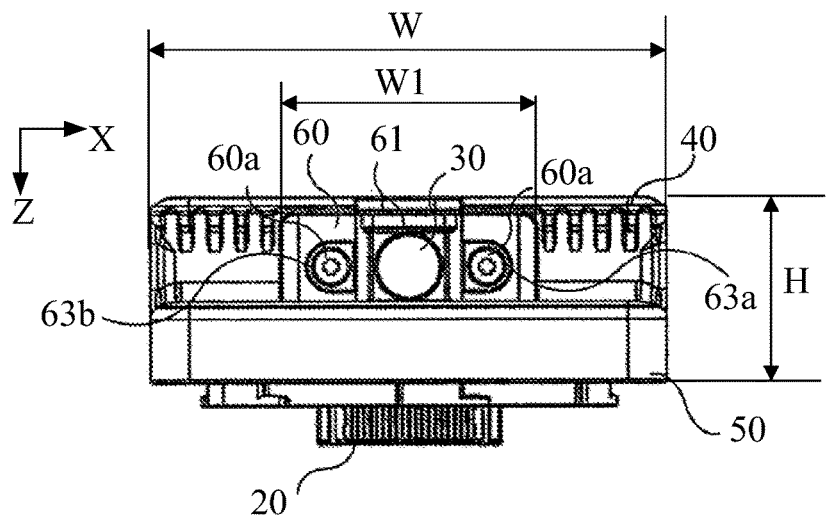
FIGS. 4A to 4C are front, top, and side views of the coupler.
Figures 4A, 4C:
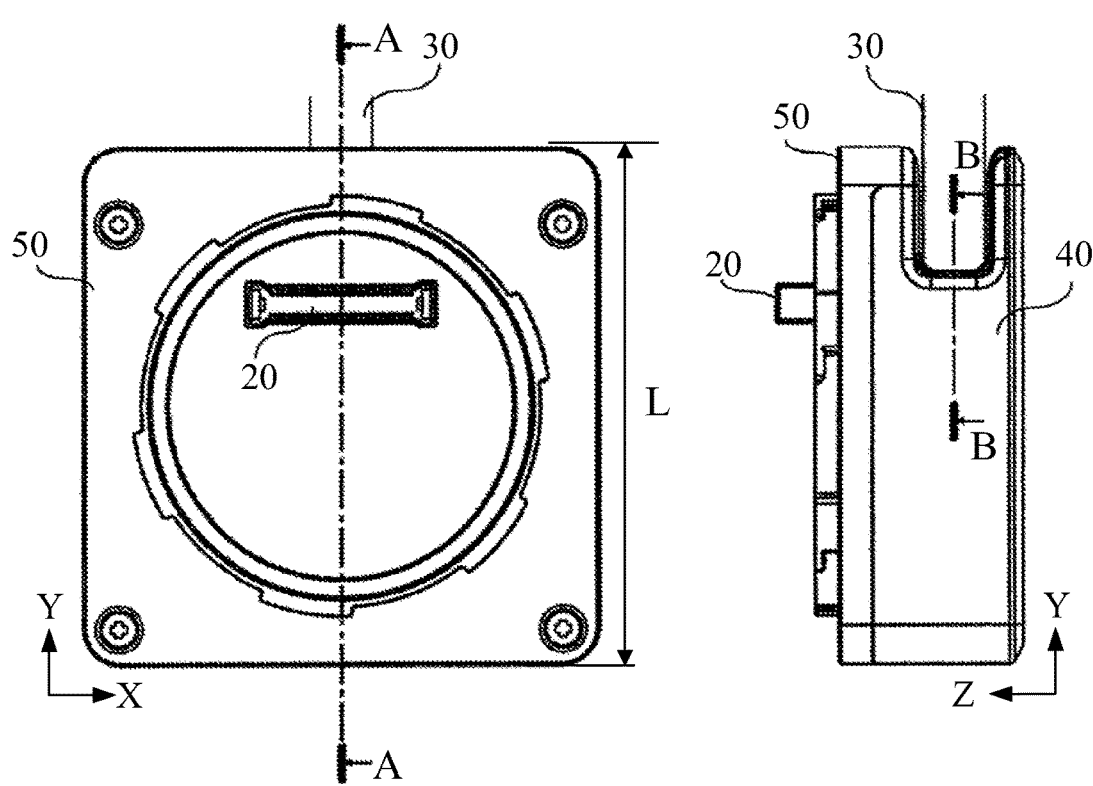
Figure 6:
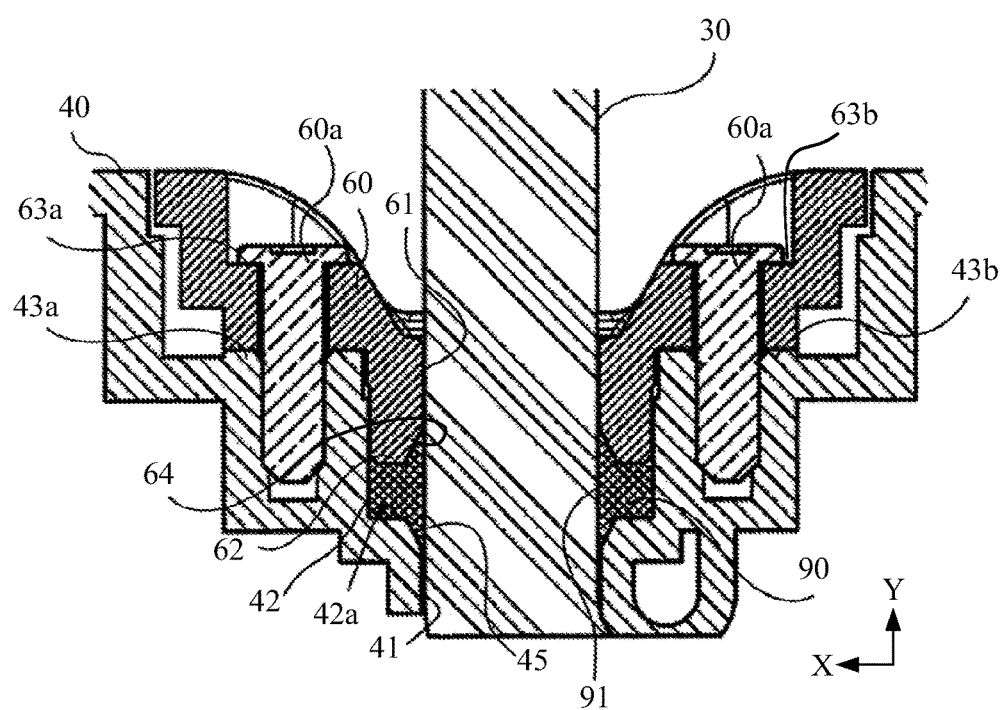
FIG. 6 is a sectional view taken along a line B-B of FIG. 4C.

Referring now to FIGS. 3, 4A, 4B, 5, and 6, a description will be given of the configuration of the cable insertion portion in the coupler 1. FIG. 3 illustrates the upper surface of the case 40 viewed from the axial direction (-Y direction) of the cable 30. However, the cable 30 is omitted in FIG. 3. FIG. 4A illustrates the front of the coupler 1 viewed from the -Z direction, and FIG. 4B illustrates the upper surface of the coupler 1 viewed from the -Y direction. FIG. 4C illustrates a side view of the coupler 1 viewed from the -X direction. FIG. 5 illustrates an A-A section (YZ section) in FIG. 4A, and FIG. 6 illustrates a B-B section in FIG. 4C.

As illustrated in FIG. 3, the seal container 42 is formed inside the case 40, and adjacent to and connected to the cable insertion hole portion 41. The seal ring 90 is disposed in the seal container 42 while the cable 30 is inserted into the perforation hole portion 91. Screw holes 43a and 43b for fixing the pressing member 60 are formed on both sides of the seal container 42 in the case 40 in the X direction.

As illustrated in FIGS. 4B and 6, the pressing member 60 has hole portions 63a and 63b as two fixed portions on both sides of the perforation hole portion 61 in the X direction. While the cable 30 passes through the perforation hole portion 61 in the pressing member 60, the two fixing screws 60a inserted into the hole portions 63a and 63b are tightened into the screw hole portions 43a and 43b in the case 40 and fixed into the case 40. The cable 30 linearly extends in the Y direction from the inside of the perforation hole portion 61 in the pressing member 60 to the inside of the cable insertion hole portion 41 in the case 40.

The pressing portion 62 in the pressing member 60 fixed onto the case 40 presses the seal ring 90 disposed in the seal container 42 in the Y direction between the seal ring 90 and a bottom surface 42a opposite to the pressing portion 62 in the seal container 42 and compress and deforms it. As illustrated in FIG. 6, a truncated cone surface 45 (slope) inclined to (the axial direction of) the cable 30 is formed on the inner circumferential portion connected to the cable insertion hole portion 41 in the seal container 42 and opened on the seal ring side. A truncated cone surface 64 as an slope inclined to (the axial direction of) the cable 30 is formed on an inner circumferential portion connecting the pressing portion 62 and the perforation hole portion 61 to each other and opened on the seal ring side.

A peripheral portion (referred to as a seal portion hereinafter) of the perforation hole 91, which is part of the seal ring 90 pressed in the Y direction by the pressing portion 62 of the pressing member 60, is inserted into a space between the truncated cone surfaces 45 and 64 and the cable 30. The truncated cone surfaces 45 and 64 serve to press the seal portion of the seal ring 90 against the radial center of the cable 30 and to make it adhere to the surface of the cable 30. The contact area of the seal ring 90 with the surface of the cable 30 at this time is equal to or larger than the contact area of the seal ring 90 with the surface of the cable 30 before it is pressed by the pressing portion 62. This configuration can improve the sealing effect between the cable 30 and the seal ring 90.

When the user uses the coupler 1 and pulls or presses the cable 30 relative to the case 40, the cable 30 may shift in its axial direction (Y direction). However, even in this case, the seal portion of the seal ring 90 pressed against the radial center of the cable 30 by the truncated cone surfaces 45 and 64 maintains the sealing effect between the cable 30 and the seal ring 90.

Due to the above configuration, the coupler 1 according to this embodiment has a high sealing effect between the cable 30 and the seal ring 90, and exhibits excellent waterproof and dustproof functions. This embodiment has described the two truncated cone surfaces 45 and 64, but may include only one of these two truncated cone surfaces 45 and 64.

As described above, the pressing member 60 has the hole portions 63a and 63b on both sides in the perforation hole portion 61. While the pressing member 60 is fixed onto the case 40, the outer size of the case (40, 50) is the width W in the X direction (the first direction) in which the perforation hole portion 61 of the pressing member 60 and the holes 63a and 63b are aligned. The outer size of the case (40, 50) is a length L in the Y direction (second direction) in which the cable insertion hole portion 41 and the perforation hole portions 91 and 61 are aligned through which the cable 30 passes. The outer size of the case (40, 50) is the height (thickness) H in the Z direction (third direction) orthogonal to the X direction and the Y direction.

This embodiment forms, as illustrated in FIGS. 1A, 1B, 4A and 4C, the case (40, 50) such that its height H may be equal to or smaller than width W (may be smaller than the width W). The width W and the length L may be (strictly or substantially) equal to each other, but one of them may be larger than the other. The pressing member 60 according to this embodiment is formed such that a thickness H1 illustrated in FIG. 5 is smaller than a width W1 illustrated in FIG. 4B.

As illustrated in FIG. 5, the pressing member 60 is formed such that the thickness H1 in the Z direction is (strictly or substantially) equal to an outer size (outer diameter) D of the seal ring 90 in the Z direction. Thereby, the thickness H1 of the pressing member 60 can be made a minimum necessary size, and the width W1 of the pressing member 60 can be made smaller than the thickness H1. As a result, the height H of the coupler 1 can be made smaller.

This embodiment has described the components of the coupler 1 fixed by the screw, but may fix the components when they are made of a plastic material by a method other than the screw such as ultrasonic welding. The components may be fixed by snap fitting.

This embodiment has described the coupler having the cable and the connector, but a variety of electronic apparatuses having the cable are also included in the embodiment of the present invention.

This embodiment can provide a compact electronic apparatus having good waterproof and dustproof functions of a case having a hole portion into which a cable is inserted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-86462, filed on Apr. 27, 2018, which is hereby incorporated by reference herein in its entirety.

What is claimed is:

1. An electronic apparatus comprising: a deformable seal member having a first hole portion through which a cable passes; a case that includes a seal container configured to house the seal member and a second hole portion connected to the seal container and used for the cable to pass; and a pressing member fixed to the case and including a third hole portion through which the cable passes, and a pressing portion configured to press the seal member housed in the seal container, wherein at least one of part of the seal container connected to the second hole portion and part of the pressing member connecting the pressing portion and the third hole portion to each other has a slope inclined to the cable, and wherein the seal member pressed by the pressing portion partially enters a space between the slope and the cable.

2. The electronic apparatus according to claim 1, wherein a peripheral portion of the first hole portion in the seal member pressed between the pressing portion and a surface of the seal container facing the pressing portion is pushed out toward the cable by the slope.

3. The electronic apparatus according to claim 1, wherein the pressing member has fixed portions fixed to the case on both sides of the third hole portion, wherein a first direction is a direction in which the third hole portion and the fixed portion are aligned, a second direction is a direction in which the first, second, and third hole portions are aligned, and a third direction is a direction orthogonal to the first and second directions, and wherein a size of the case in the third direction is equal to or smaller than a size of the case in the first direction.

4. The electronic apparatus according to claim 3, wherein the size of the pressing member in the third direction is smaller than the size of the pressing member in the first direction.

5. The electronic apparatus according to claim 1, wherein the case includes a guide portion configured to bend the cable extending in the case through the third, first, and second hole portions.

6. The electronic apparatus according to claim 1, wherein the case holds an electric circuit board connected to the cable.

7. The electronic apparatus according to claim 1, further comprising a connector connected to an electric circuit board and protruding to outside of the case.

* * * * *